United States Patent [19]
Ahnger et al.

[11] Patent Number: 5,609,029
[45] Date of Patent: Mar. 11, 1997

[54] THERMAL POWER ENGINE AND ITS OPERATING METHOD

[75] Inventors: Anders Ahnger; Stefan Storholm, both of Vasa; Kaj Bäckman, Esbo, all of Finland

[73] Assignee: Wartsila Diesel International Ltd Oy, Helsinki, Finland

[21] Appl. No.: 566,128

[22] Filed: Dec. 1, 1995

Related U.S. Application Data

[63] Continuation of Ser. No. 270,494, Jul. 5, 1994, abandoned.

[30] Foreign Application Priority Data

Jul. 8, 1993 [FI] Finland ................... 933126

[51] Int. Cl.$^6$ ................... F01K 23/10
[52] U.S. Cl. ................... 60/618
[58] Field of Search ................... 60/618; 237/12.1

[56] References Cited

U.S. PATENT DOCUMENTS

| | | | |
|---|---|---|---|
| 982,850 | 1/1911 | Noyes | 60/618 |
| 3,350,876 | 11/1967 | Johnson | 60/618 |
| 3,979,913 | 9/1976 | Yates | 60/618 |
| 4,182,127 | 1/1980 | Johnson | 60/618 |
| 4,300,353 | 11/1981 | Ridgway | 60/618 |
| 4,901,531 | 2/1990 | Kubo et al. | 60/618 |
| 5,176,000 | 1/1993 | Dauksis | 60/618 |

FOREIGN PATENT DOCUMENTS

| | | | |
|---|---|---|---|
| 0259545 | 3/1988 | European Pat. Off. | |
| 699425 | 12/1930 | France | 60/618 |
| 329318 | 11/1920 | Germany | |
| 2618584 | 11/1977 | Germany | |
| 3009170 | 9/1981 | Germany | |
| 58-53608 | 3/1983 | Japan | 60/618 |
| 119039 | 7/1933 | U.S.S.R. | 60/618 |
| 581680 | 10/1946 | United Kingdom | 60/618 |

OTHER PUBLICATIONS

Patent Abstracts Of Japan, vol. 7, No. 141 (M–223)(Abstract of Japanese Patent Application No. 58–053608), 1983.

*Primary Examiner*—Michael Koczo
*Attorney, Agent, or Firm*—Smith-Hill and Bedell

[57] ABSTRACT

A method for improving the total production of useful energy in an energy utilization system of a thermal power engine (1) that is liquid-cooled and is used for the production of thermal energy as well as mechanical energy. In the energy utilization system, thermal energy is taken from the coolant of the engine cooling system. At least a part of the coolant from the engine is led to a vaporization space (5) where, either by lowering the pressure or by increasing the amount of thermal energy within that space (5), a part of the coolant is transformed to vapor. The vapor is used within the energy utilization system for energy transport and/or as a medium for recovering energy.

23 Claims, 3 Drawing Sheets

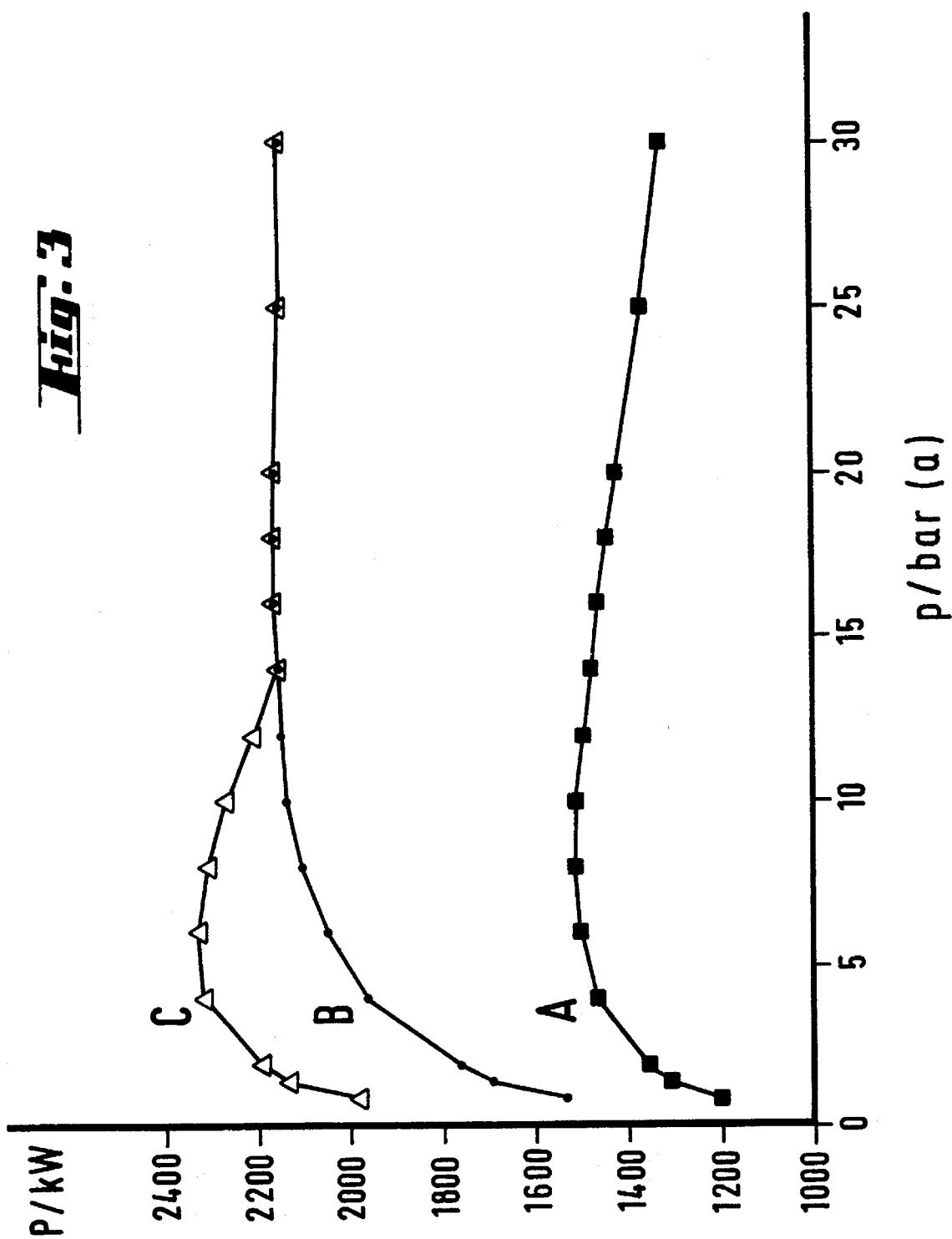

THERMAL POWER ENGINE AND ITS OPERATING METHOD

CROSS REFERENCE TO RELATED APPLICATION

This application is filed as a continuation of application Ser. No. 08/270,494 filed Jul. 5, 1994 and now abandoned.

BACKGROUND OF THE INVENTION

The invention relates to a method for improving the total production of useful energy of an internal combustion engine producing heat and mechanical energy, herein sometimes referred to as a "thermal power engine," and to an engine intended for the application of this method.

In operation of a thermal power engine, the energy content of fuel supplied to the engine is converted partly to mechanical energy, which is made available at a mechanical power output of the engine, and partly to thermal energy, of which a portion is removed from the engine by the engine's cooling system. In order to maximize the overall efficiency of the engine, it is desirable that the thermal energy be applied to a useful purpose and not discharged as waste heat.

In known large internal combustion engines, such as for example large diesel engines, the cooling system of the engine often raises the temperature of the coolant to a level that is less than 100° C., usually in the range 80° C. to 85° C. It is difficult to find a useful application for waste heat at such low temperature values, and consequently a significant part of the energy content of the fuel consumed will not be used for useful purposes. In some rather large plants employing thermal power engines the thermal energy of the coolant has however been used, by means of heat exchangers, to produce, for example, warm water (e.g. warm process water) or for district heating applications.

A thermal power plant may comprise several thermal power engines, whereby the total power output of the plant may be of the order of magnitude of 100 MW. The greater is the power of a thermal power engine or a power plant containing such engines, the more important for energy saving it is to find a useful application for its waste heat and the better are the chances that the investments made for waste heat recovery will prove to be profitable.

SUMMARY OF THE INVENTION

An aim of this invention is to create a thermal power engine, for example a diesel engine, in which it is possible to utilize the heat energy produced in a more efficient manner.

By vaporizing, for example, some of the coolant used in a diesel engine, a part of its thermal energy is absorbed as heat of vaporization. Vapor is a medium, the contained thermal energy of which can be quite effectively utilized by known methods. The partial vaporization is obtained either by lowering the pressure or by supplying additional thermal energy to a vaporization space. The vaporization takes place preferably in a separate vaporization space outside the thermal power engine, but vaporization may also theoretically take place by using heat produced by the engine in the cooling system of the engine, although this method of operating requires that the vaporization process takes place in such a part of the engine and under such good control that it is not harmful or dangerous to the functioning of the engine.

It is of advantage to build thermal power engines intended to operate according to the invention as rather large units, having normally an output power of the order of magnitude of some megawatts, even some tens of megawatts.

In a thermal power engine operating according to the invention, it is of advantage for thermotechnical reasons to operate with a coolant temperature above the normal range of 80° C. to 85° C. This requires, however, that the thermal power engine be able to withstand coolant temperatures above normal in its cooling system and that the temperature of the coolant is properly supervised and controlled.

By superheating the vapor that is produced in accordance with the invention by using different waste heat sources associated with a thermal power engine, for example by means of the exhaust gases, the usefulness of the vapor for practical purposes is improved. Vapor, in particular superheated vapor, may be used for many purposes, for example as a process vapor in different machines and devices or for the production, e.g. in a steam turbine, of mechanical energy which can easily be converted to electric energy.

It is known to improve the utilization of vapor by condensing the vapor at very low pressure in a condenser and returning it, in liquid state, to a vaporization circuit. In accordance with the invention, this known technique is applied to the cooling system of a thermal power engine. By preheating the returning condensate, with waste heat taken from the thermal power engine, a favorable condition is created either for its revaporization before return to the cooling system or for use of its remaining thermal energy by feeding the condensate into the coolant circuit from where the thermal energy may be utilized as described.

A part of the cooling medium returned to liquid phase may be led, before its return to the cooling system, to a second circuit where a fresh vaporization is accomplished using the heat content of the flow of some hot medium available from the thermal power engine. In this way at least a part of the vapor produced may be fed into the vapor flow emanating from the first vaporization phase before any possible superheating of the vapor has been undertaken. A part of the vapor of the second circuit may also form a separate circuit passing through a turbine and a condenser. These types of circuits open up the possibility of utilizing a heretofore unused part of the waste heat of a thermal power engine in a coolant circuit according to the invention.

By keeping the pressure of the cooling system of a thermal power engine at a level of more than 2 bar, and preferably more than 5 bar, it will be possible, when using pure water as a coolant, to raise its temperature considerably over 100° C. without causing boiling. For applying the invention, it is believed that pure water is the best coolant. If its pressure is kept so high that the temperature in the cooling system may exceed 140° C., good conditions prevail for utilizing, according to the invention, the thermal energy of the coolant.

The invention may, with advantage, be applied to a large supercharged diesel engine, in which some high temperature medium flow of the supercharging arrangement of the engine can be used for superheating vapor received from the coolant of the engine and/or for revaporizing condensed coolant. Thereby a substantial part of the waste heat of the supercharging arrangement can also be recovered. The high temperature charge air of the supercharging arrangement may be used for superheating vapor and/or for vaporizing condensate, whereby at the same time cooling of the charge air is achieved, which allows the operating efficiency of the engine to be optimized.

If, in an arrangement according to the invention, the energy required for the vaporization of the coolant largely corresponds to the amount of thermal energy transferred to the coolant from the thermal power engine, a thermally balanced arrangement is achieved and at the same time the waste heat of the cooling arrangement of the engine is effectively utilized.

BRIEF DESCRIPTION OF THE DRAWINGS

The invention will now be further described in greater detail, by way of example, with reference to the accompanying drawings, in which:

FIG. 3 shows a graph of the shaft power of a steam turbine utilizing waste energy from a thermal power engine, as a function of absolute vapor pressure in three different operating modes.

DETAILED DESCRIPTION

Figure 1:
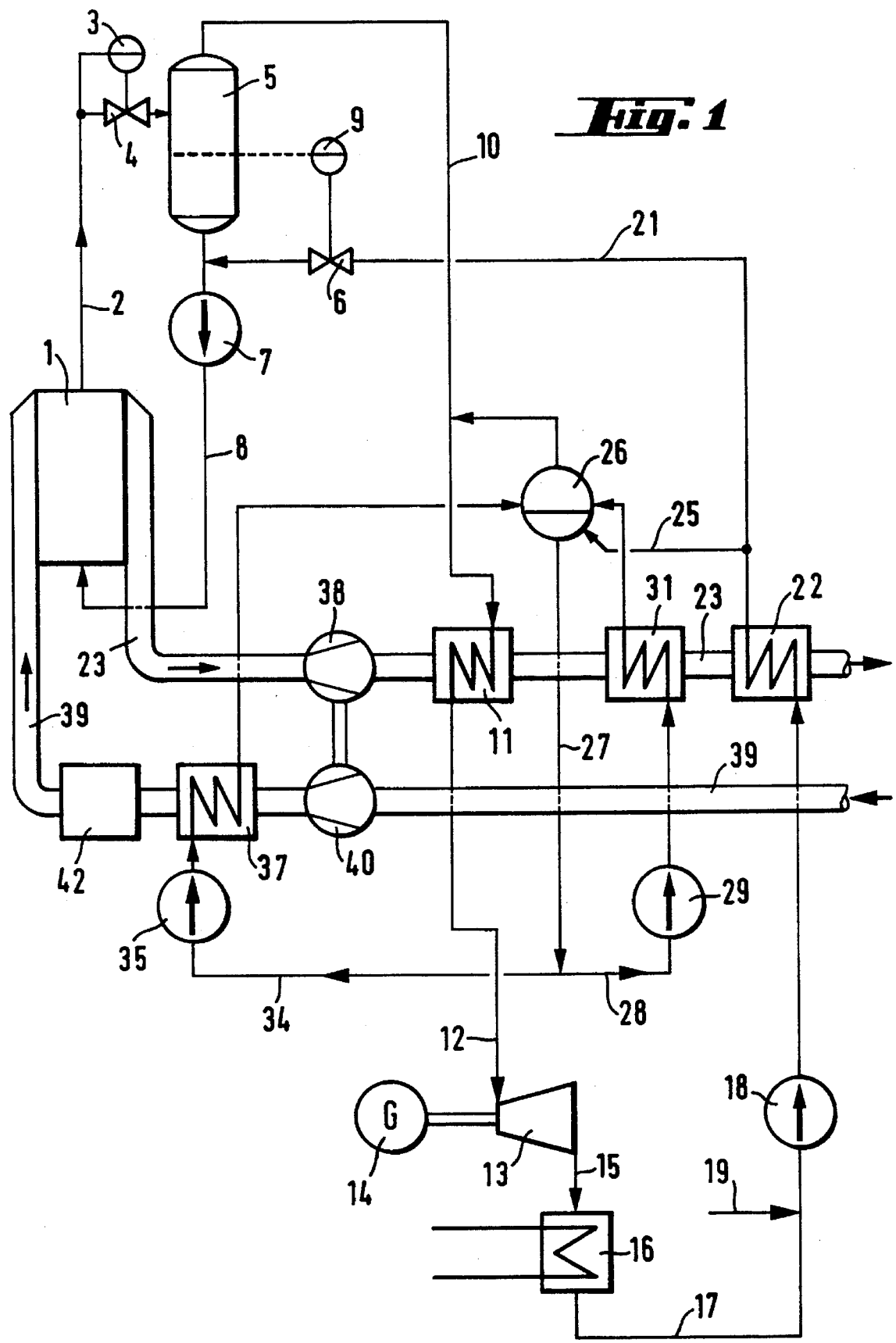
FIG. 1 shows a schematic diagram of one arrangement according to the invention.

In FIG. 1, 1 indicates a thermal power engine, for example a large water-cooled supercharged diesel engine. The cooling system of the engine 1 includes a pipe 2 which has a pressure and temperature monitoring control device 3 operating a valve 4 for controlling the pressure in the coolant (cooling water). The pressure of coolant is maintained by a pump 7, supplying coolant through a pipe 8. The cooling water is led to a tank 5, in which the pressure is so much lower than in the coolant passages in the engine 1, that a part of the cooling water (typically under 5 percent) is transformed into steam. That part of the cooling water (usually over 95 percent), which does not become vaporized, is, by means of the pump 7, pumped through the pipe 8 back to the coolant passages of the engine 1. The level of liquid in the tank 5 is monitored by a control device 9, which controls the back flow of water in a pipe 21 by means of a throttle valve 6.

The pressure in the cooling system of the engine 1 and in the tank 5 is preferably so selected that the pressure of the steam generated is from 4 to 8 bar, in the embodiment shown about 6 bar, the temperature being correspondingly about 159° C. The steam is led through a pipe 10 to a superheater 11 in the exhaust line 23 of the engine 1, in which its temperature rises to about 300° C. From the superheater 11 the steam is led through a pipe 12 to a steam turbine 13, in which the steam is used to generate mechanical energy, which, as illustrated, is used for producing electricity in a generator 14.

From the turbine 13, low pressure steam ($\leq 0.1$ bar) flows through a pipe 15 to a condenser 16, from which the condensate water is led, through a pipe 17, to a pump 18. The pump 18 raises the pressure of the water to such a level that the water, after passing through a preheater 22 also provided on the exhaust line 23, the pipe 21 and the throttle valve 6, is able to join the water flow in the pipe 8 on the suction side of the pump 7.

Possible leakage losses are replaced by water fed through a pipe 19 upstream of the pump 18. In the superheater 11, in the preheater 22 and in an exhaust gas vaporizer 31, thermal energy is obtained from the hot exhaust gases of the engine 1, which are led away from the engine through the exhaust gas line 23.

Downstream of the heat exchanger 22, the temperature of the water is about 159° C. A part of the preheated water is, in the embodiment according to FIG. 1, led through a pipe 25 to a tank 26 which functions as a vapor separator and from which the water separated out is led through a pipe 27 to two branches 28 and 34. Branch 28 passes, via a pump 29, to the exhaust gas vaporizer 31 and branch 34 passes, via a pump 35, to a charge air vaporizer 37 heated by compressed charge air flowing to the engine 1 through a pipe 39. The branches 28 and 34 unite again in the tank 26, from which the steam separated out is led back to the pipe 10.

The supercharging arrangement of the engine 1 comprises an exhaust gas turbine 38 and a charge air compressor 40 driven by the turbine 38. The temperature of the supercharged air may rise close to 250° C. With respect to efficiency considerations of engine operation, it is important to cool the charge air and the required cooling may at least partly take place as shown using the vaporizer 37. Further air cooling in a cooler 42 is usually required, which lowers the temperature of the charge air to a desired centigrade value.

Figure 2:
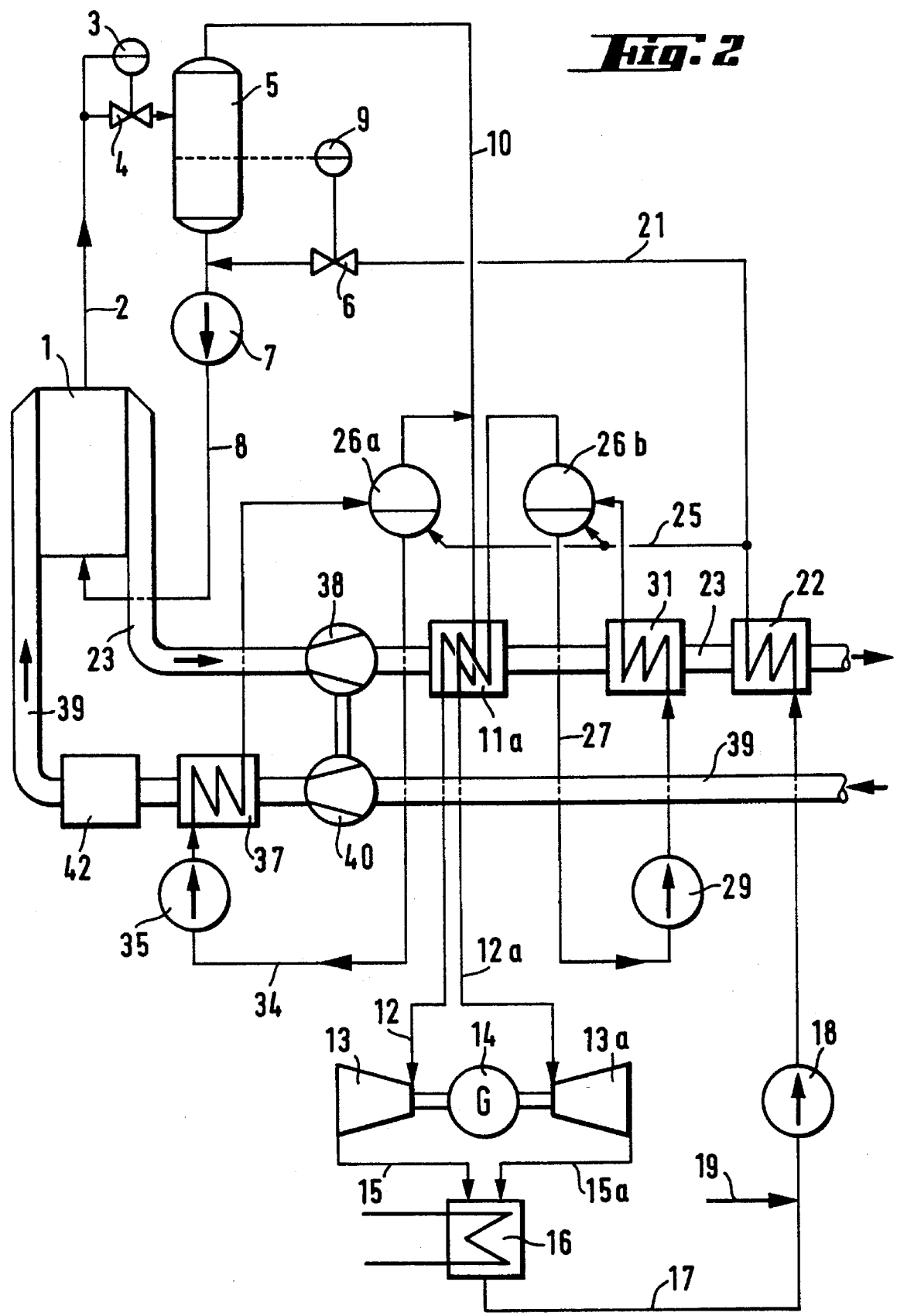
FIG. 2 shows a flow diagram of another embodiment of the invention.

FIG. 2 has much in common with FIG. 1 and like reference numerals have the same meaning in both figures. In the embodiment according to FIG. 2, the superheater 11 has been replaced by a twin superheater 11a, which has two separate steam flow ducts. The circulation path through the twin superheater 11a, which includes the pipe 12, the steam turbine 13, the condenser 16 and the preheater 22, corresponds to the arrangement shown in FIG. 1.

Downstream of the preheater 22, a part of the preheated water is led through the pipe 25 to two separate tanks 26a and 26b, each of which operates as a steam separator. From the tank 26a, the water is led through the pipe 34 and the pump 35 to the charge air vaporizer 37 from which the generated steam-water mixture is led back to the tank 26a and there, further, to the pipe 10 just as shown in the embodiment of FIG. 1. From the tank 26b, the water is led through the pipe 27 and the pump 29 to the exhaust gas vaporizer 31, from which the steam-water mixture generated, as in the embodiment according to FIG. 1, is led back, but now to the tank 26b, from which the steam flows through the second flow duct of the twin superheater 11a and through a pipe 12a to a second steam turbine 13a and there produces mechanical energy. The low pressure steam ($\leq 0.1$ bar), received from the steam turbine 13a flows through a pipe 15a to the condenser 16, in which it unites with the low pressure steam flow coming from the steam turbine 13.

The use of two separate steam turbines is justifiable, because the temperature and the pressure of the steam received from the exhaust gas vaporizer 31 are notably higher than the temperature and pressure of the steam received both from the charge air vaporizer 37 and from the tank 5.

In the graph of FIG. 3, curve A represents, as a function of the steam pressure p (in bar), the shaft power p (in kilowatts) of a steam turbine utilizing the waste heat of a diesel engine when the steam turbine recovers thermal energy only from the exhaust gases of the engine.

Curve B in FIG. 3 represents the shaft power of the turbine as a function of the steam pressure, when a part of the thermal energy of the liquid coolant circulating in the engine is vaporized and used according to the invention for useful purposes with the arrangement shown in FIG. 1 but without the charge air vaporizer 37 and its circulation arrangement (i.e. without using the circuit 26, 27, 34, 35, 37, and 26). Curve B shows that the shaft power of the steam turbine rises some 30 to 40 percent compared to the application represented by curve A. However, the relationship between the power of the steam turbine and the steam pressure is not a convenient one in curve B because it is difficult to achieve the high steam pressures (greater than about 10 bar) which correspond to maximum power output. Thus, the most advantageous areas of curve B will not easily be attainable in practice.

Curve C corresponds to an application according to FIG. 1 but using all the heat utilization arrangements shown. It is considerably more advantageous than that represented by curve B, because now the peak power occurs within the pressure range 4 to 6 bar, which is a realistic pressure range for utilizing the invention.

The arrangement of FIG. 2 gives a curve similar to curve C.

The invention is not restricted to the embodiments illustrated, since several modifications are feasible within the scope of the following claims.

We claim:

1. A method of operating a liquid-cooled thermal power diesel engine that is used in a power plant for production of mechanical energy and includes a secondary energy utilization system for utilization of waste thermal energy produced by the engine, said method comprising maintaining a higher coolant pressure in the engine than in a vaporization space defined by the secondary energy utilization system, said higher coolant pressure being sufficient that the coolant in the engine is liquid, delivering coolant that has been heated in the engine to the vaporization space and thereby vaporizing some of the coolant in the vaporization space, superheating the coolant vapor by thermal exchange with a hot fluid flow of the engine, and using the coolant vapor for energy transport and/or recovering energy from the coolant vapor, and wherein the quantity of energy required for vaporizing the coolant in the vaporization space substantially corresponds to the quantity of energy transferred to the coolant during its cooling of the thermal power engine block, whereby a thermally balanced cooling and heat utilization arrangement is achieved.

2. A method according to claim 1, comprising employing a pump having a suction side connected to receive liquid coolant from the vaporization space and a pressure side connected to force liquid coolant successively through a coolant passage of the engine and a restriction and into the vaporization space, whereby the coolant is circulated.

3. A method according to claim 2, comprising controlling the restriction in accordance with pressure of coolant upstream of the restriction.

4. A method according to claim 2, comprising condensing the coolant vapor and supplying the coolant liquid thus formed to the suction side of the pump.

5. A method according to claim 1, comprising delivering the coolant vapor to a turbine for producing useful mechanical energy.

6. A method according to claim 1, comprising condensing the coolant vapor to liquid phase and returning the liquid coolant thus formed to the engine.

7. A method according to claim 6, comprising diverting some of the liquid coolant flow returning to the engine, revaporizing part of the diverted liquid coolant by thermal exchange with a hot fluid flow of the engine, and combining at least a part of the vapor formed by such revaporization with the coolant vapor flow from the vaporization space.

8. A method according to claim 7, comprising feeding part of the vapor formed by revaporization to a turbine for producing useful mechanical energy, and condensing the coolant vapor downstream of the turbine.

9. A method according to claim 6, comprising diverting some of the liquid coolant flow returning to the engine, revaporizing part of the diverted liquid coolant by thermal exchange with a hot fluid flow of the engine, and combining at least a part of the vapor formed by such revaporization with the coolant vapor flow from the vaporization space, and superheating the combined coolant vapor flow by means of thermal exchange with a hot fluid flow of the engine.

10. A method according to claim 1, comprising condensing the coolant vapor to liquid phase, preheating the liquid coolant formed by condensing the coolant vapor by thermal exchange with a hot fluid flow of the engine, and returning the condensed and preheated coolant to the engine.

11. A method according to claim 1, comprising maintaining the pressure of liquid coolant in the engine at a level of more than 2 bar.

12. A method according to claim 11, comprising maintaining the pressure of liquid coolant in the engine at more than 5 bar.

13. A method according to claim 11, comprising maintaining the pressure of liquid coolant in the engine sufficiently high that the temperature of the coolant may, without boiling, exceed 100° C.

14. A method according to claim 11, comprising maintaining the pressure of liquid coolant in the engine sufficiently high that the termperature of the coolant may, without boiling, exceed 140° C.

15. A method according to claim 1, comprising condensing the coolant vapor to liquid phase, and wherein the step of maintaining a higher coolant pressure in the engine than in the vaporization space comprises pumping the liquid coolant to the engine and limiting flow of coolant from the engine to the vaporization space.

16. A method according to claim 1, comprising separating the coolant vapor from liquid coolant in the vaporization space.

17. A method of operating a liquid-cooled diesel engine that is used in a power plant for production of mechanical energy and includes a secondary energy utilization system for utilization of waste thermal energy produced by the engine, said method comprising maintaining a higher coolant pressure in the engine than in a vaporization space defined by the secondary energy utilization system, said higher coolant pressure being sufficient that the coolant in the engine is liquid, delivering coolant that has been heated in the engine to the vaporization space and thereby vaporizing some of the coolant in the vaporization space, using the coolant vapor thus formed for energy transport and/or recovering energy from the coolant vapor, and superheating at least part of the coolant that was vaporized in the vaporization space by thermal exchange with a high temperature fluid flow of the engine, and wherein the quantity of energy required for vaporizing the coolant in the vaporization space substantially corresponds to the quantity of energy transferred to the coolant from the thermal power engine, whereby a thermally balanced arrangement is achieved.

18. A method according to claim 17, wherein the engine is supercharged, and said method comprises employing a supercharging arrangement of the engine to provide said high temperature fluid flow.

19. A method according to claim 17, wherein the engine is supercharged and the high temperature fluid flow is charge air provided by the supercharging arrangement of the engine, whereby the charge air is cooled.

20. A method according to claim 17, wherein exhaust gas is supplied from the engine to an exhaust gas turbine and the exhaust gas turbine is employed to drive an air compressor for supplying combustion air to the engine, and the method comprises employing compressed air supplied by the air compressor as said high temperature fluid flow.

21. A method according to claim 17, wherein the high temperature fluid flow is an exhaust gas flow of the engine.

22. A method according to claim 17, comprising condensing the coolant vapor and revaporizing the condensate by thermal exchange with said high temperature fluid flow.

23. Energy conversion apparatus comprising a liquid-cooled thermal power engine and a secondary energy utilization system connected to receive coolant from the engine, the secondary energy utilization system comprising a means defining a vaporization space for receiving coolant from the engine, a means for maintaining a higher coolant pressure in the engine than in the vaporization space, whereby coolant vaporizes on passing from the engine to the vaporization space, a superheater means for superheating the coolant vapor by thermal exchange with a hot fluid flow of the engine, and a means for using the coolant vapor formed in the vaporization space for energy transport and/or recovering energy from the coolant vapor.

* * * * *